(12) United States Patent
Gao et al.

(10) Patent No.: US 10,911,202 B2
(45) Date of Patent: Feb. 2, 2021

(54) UPLINK AND DOWNLINK TRANSMISSION RESOURCE ALLOCATION METHOD AND DEVICE

(71) Applicant: CHINA ACADEMY OF TELECOMMUNICATIONS TECHNOLOGY, Bejing (CN)

(72) Inventors: Xuejuan Gao, Beijing (CN); Fang-chen Cheng, Beijing (CN); Xueming Pan, Beijing (CN); Shaohui Sun, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 46 days.

(21) Appl. No.: 16/075,141

(22) PCT Filed: Jan. 17, 2017

(86) PCT No.: PCT/CN2017/071427
§ 371 (c)(1),
(2) Date: Aug. 2, 2018

(87) PCT Pub. No.: WO2017/133444
PCT Pub. Date: Aug. 10, 2017

(65) Prior Publication Data
US 2018/0375633 A1  Dec. 27, 2018

(30) Foreign Application Priority Data

Feb. 3, 2016 (CN) .......................... 2016 1 0077334
Dec. 30, 2016 (CN) .......................... 2016 1 1270963

(51) Int. Cl.
H04W 4/00 (2018.01)
H04L 5/00 (2006.01)
(Continued)

(52) U.S. Cl.
CPC .......... *H04L 5/0053* (2013.01); *H04L 5/0044* (2013.01); *H04L 5/1469* (2013.01);
(Continued)

(58) Field of Classification Search
None
See application file for complete search history.

(56) References Cited

U.S. PATENT DOCUMENTS

2009/0218315 A1  9/2009 Shannon
2014/0295832 A1* 10/2014 Ryu ...................... H04W 48/16
455/434
(Continued)

FOREIGN PATENT DOCUMENTS

| CN | 103023822 A | 4/2013 |
| CN | 103118433 A | 5/2013 |
| WO | 2014006994 A1 | 9/2014 |

OTHER PUBLICATIONS

State IP Office of PR China—International Search Report of the International Searching Authority with an English copy of the International Search Report dated Mar. 21, 2017 for International Application No. PCT/CN2017/071427 (5 pgs).
(Continued)

*Primary Examiner* — Phirin Sam
(74) *Attorney, Agent, or Firm* — Womble Bond Dickinson (US) LLP

(57) ABSTRACT

Disclosed are an uplink and downlink transmission resource allocation method and device. In this application, a first channel is transmitted on a specified time-frequency resource within a first channel transmitting period according to the first channel transmitting period. The first channel is at least used for notifying allocation information of an uplink transmission resource and a downlink transmission resource within the first channel transmitting period or an effective time period of the first channel, so that dynamic (Continued)

partitioning and notification of the uplink transmission resource and the downlink transmission resource are achieved.

20 Claims, 5 Drawing Sheets

(51) Int. Cl.
    *H04W 72/04*     (2009.01)
    *H04L 5/14*     (2006.01)
    *H04L 27/26*     (2006.01)
    *H04W 72/12*     (2009.01)

(52) U.S. Cl.
    CPC ....... *H04L 27/2607* (2013.01); *H04W 72/042* (2013.01); *H04W 72/0413* (2013.01); *H04W 72/1205* (2013.01); *H04W 72/0446* (2013.01); *H04W 72/0486* (2013.01)

(56) References Cited

U.S. PATENT DOCUMENTS

| | | | | |
|---|---|---|---|---|
| 2015/0249525 A1* | 9/2015 | Liu | ................ | H04W 74/006 370/329 |
| 2016/0013878 A1* | 1/2016 | Zhao | ................ | H04L 25/03968 370/329 |
| 2016/0044644 A1* | 2/2016 | Lyu | ................ | H04W 72/042 370/329 |
| 2017/0188371 A1* | 6/2017 | Kim | ................ | H04W 24/10 |
| 2018/0343682 A1* | 11/2018 | Tang | ................ | H04L 5/0078 |
| 2019/0268929 A1* | 8/2019 | Lee | ................ | H04L 1/0026 |

OTHER PUBLICATIONS

State IP Office PR China—Written Opinion of the International Searching Authority dated Mar. 21, 2017 for International Application No. PCT/CN2017/071427 (3 pgs).

HTC—"Discussion on TDD UL-DL Reconfiguration in Tdd eIMTA Systems." 3GPP TSG RAN WG1 Meeting #73 R1-132075, May 24, 2013, pp. 1-5.

Official Japanese Office Action for Application No. 2018540843 dated Jun. 28, 2019, 3 pages.

"System Analysis on TTI Shortening," 3GPP TSG RAN WG1 #83, Nov. 15-22, 2015, 8 pgs, R1-156613, Anaheim California.

The third office action of Japanese Patent Application No. JP2018-540843 dated Nov. 2, 2020, 4 pages.

* cited by examiner

UPLINK AND DOWNLINK TRANSMISSION RESOURCE ALLOCATION METHOD AND DEVICE

CROSS-REFERENCE TO RELATED APPLICATIONS

This patent application is a U.S. National Phase application under 35 U.S.C. § 371 of International Application No. PCT/CN2017/071427, filed on 17 Jan. 2017, entitled UPLINK AND DO' NUNK TRANSMISSION RESOURCE ALLOCATION METHOD AND DEVICE, which claims the benefit of priority to Chinese Patent Application No. 201610077334.8, filed with the Chinese Patent Office on Feb. 3, 2016, and entitled "A method and apparatus for allocating uplink transmission resources and downlink transmission resources", and Chinese Patent Application No. 20161127063.9, filed with the Chinese Patent Office on Dec. 30, 2016, and entitled "A method and apparatus for allocating uplink transmission resources and downlink transmission resources", both of which were incorporated by reference in their entireties.

FIELD

The present application relates to the field of communications, and particularly to a method and apparatus for allocating an uplink transmission resource and a downlink transmission resource.

BACKGROUND

In a Long Term Evolution (LTE) system, transmission of all the existing channels is defined in a Transmission Time Interval (TTI)=1 ms, that is, a TTI is a sub-frame, and has a length of 1 ms.

In an LTE Time Division Duplex (TDD) system, the same frequency resources are shared for uplink and downlink transmission, so a radio frame which is a resource unit is divided into uplink and downlink transmission sub-frames for transmitting uplink and downlink traffic, i.e., a TDD uplink-downlink configuration. FIG. 1 illustrates a frame structure of the LTE TDD system taking a Frame Structure type 2 (FS2) as an example. In the FS2, each 10 ms radio frame includes two 5 ms half-frames, and each half-frame includes five sub-frames with a length of 1 ms. The sub-frames in the FS2 are categorized into three categories of downlink sub-frames, uplink sub-frames, and special sub-frames, and each special sub-frame includes three components of a Downlink Pilot Time Slot (DwPTS), a Guard Period (GP), and an Uplink Pilot Time Slot (UpPTS), where a downlink pilot, downlink traffic data, and downlink control signaling can be transmitted in the DwPTS; no signal is transmitted in the GP; and only a random access and a Sounding Reference Symbol (SRS) are transmitted in the UpPTS, but neither uplink traffic nor uplink control information can be transmitted in the UpPTS. Different TDD uplink-downlink configurations have different allocation proportions of uplink sub-frames and downlink sub-frames, and/or different uplink-downlink switching periodicities as depicted in Table 1. Table 1 depicts seven uplink-downlink sub-frame configurations supported in the FS2.

TABLE 1

| Uplink-downlink configurations | | | | | | | | | | | |
|---|---|---|---|---|---|---|---|---|---|---|---|
| Uplink-downlink Configuration | Downlink-to-Uplink Switch-point periodicity | Sub-frame number | | | | | | | | | |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Since the same spectrum resources are shared for uplink and downlink transmission in the TDD system, there are different allocation proportions of uplink sub-frames and downlink sub-frames in time domain, in the different TDD uplink-downlink configurations, so that uplink transmission resources and downlink transmission resources are allocated in time domain. In the prior art, the TDD uplink-downlink configurations are preconfigured via higher-layer signaling, they are statically or semi-statically varying configurations, and thus may not be adapted to a rapidly varying demand for an amount of uplink and downlink traffic, and all of their uplink-downlink proportions vary at the sub-frame level. Although transmission directions of a part of uplink sub-frames are configured dynamically via signaling in the dynamic TDD technology to vary across the uplink and the downlink, only a part of the uplink sub-frames can be configured, and there is an uplink-downlink proportion varying at the sub-frame level.

As the mobile communication technologies are evolving constantly, a user-plane delay in a future mobile communication system can be shortened using a shorter transmission time interval to thereby improve the efficiency of transmission, and an experience of a user. The length of the transmission time interval may be less than 0.5 ms, and even up to the level of one or more symbols, so that uplink and/or downlink transmission in a Time Division Multiplexing (TDM) mode can be carried in a sub-frame in the LTE system. In order to be better adapted to a dynamically varying demand for an amount of uplink and downlink traffic, and to improve the utilization ratio of spectrum resources, it is highly desirable to provide a solution to dynamically allocate an uplink transmission resource and a downlink transmission resource.

SUMMARY

Embodiments of the application provide a method and apparatus for allocating an uplink transmission resource and a downlink transmission resource so as to allocate the uplink transmission resource and the downlink transmission resource dynamically.

An embodiment of the application provides a method for allocating an uplink transmission resource and a downlink transmission resource, the method including: transmitting a first channel over a preset time-frequency resource within a first channel transmission periodicity according to the first channel transmission periodicity, wherein the first channel at least notifies allocation information of an uplink transmission resource and a downlink transmission resource within the first channel transmission periodicity, or within a validity time period of the first channel.

Optionally the first channel transmission periodicity is preconfigured or predefined, and a length thereof is N1 sub-frames or N2 symbols or N3 slots or N4 first time units or N5 micro slots, wherein all of N1, N2, N3, N4, and N5 are integers greater than or equal to 1, and a length of a first time unit is predefined as B1 sub-frames or B2 symbols or B3 slots or B4 micro slots, wherein all of B1, B2, B3, and B4 are integers greater than or equal to 1; or the validity time period of the first channel is preconfigured or predefined, and a length thereof is M1 sub-frames or M2 symbols or M3 slots or M4 first time units or M5 micro slots, wherein all of M1, M2, M3, M4, and M5 are integers greater than or equal to 1, and a length of a first time unit is predefined as B1 sub-frames or B2 symbols or B3 slots or B4 micro slots, wherein all of B1, B2, B3, and B4 are integers greater than or equal to 1.

Optionally the preset time-frequency resource is located in a first symbol or first K1 symbols within the first channel transmission periodicity in time domain, wherein K1 is an integer greater than or equal to 1.

Optionally the preset time-frequency resource is located in preset K2 Sub-Carriers (SCs) or Resource Elements (REs) or Resource Units (RUs) in frequency domain, wherein K2 is an integer greater than or equal to 1, an RU is a resource region occupying X1 symbols in time domain and X2 SCs or X2 REs in frequency domain, the X2 SCs or the X2 REs are consecutive or inconsecutive in frequency domain, and both X1 and X2 are integers greater than or equal to 1.

Optionally the preset time-frequency resource is consecutive in frequency domain; or the preset time-frequency resource is dispersed within a system bandwidth or within a bandwidth corresponding to downlink transmission under a predefined rule in frequency domain.

Optionally the preset time-frequency resource is distributed uniformly within the bandwidth with a preset granularity in frequency domain; or the preset time-frequency resource is distributed at a position of a highest frequency or a lowest frequency or a central frequency within the bandwidth in frequency domain.

Optionally the first channel at least notifies the allocation information of the uplink transmission resource and the downlink transmission resource within the first channel transmission periodicity, or within the validity time period of the first channel as follows: the first channel at least notifies allocation information of an uplink transmission resource and a downlink transmission resource in each first time unit, within the first channel transmission periodicity or within the validity time period of the first channel, wherein a length of the first time unit is predefined as B1 sub-frames or B2 symbols or B3 slots or B4 micro slots, wherein all of B1, B2, B3, and B4 are integers greater than or equal to 1.

Optionally allocations of uplink transmission resources and downlink transmission resources in respective first time units, within the first channel transmission periodicity or within the validity time period of the first channel are same; or allocations of uplink transmission resources and downlink transmission resources in respective first time units, within the first channel transmission periodicity or within the validity time period of the first channel are different from each other; or allocations of uplink transmission resources and downlink transmission resources in a part of first time units, within the first channel transmission periodicity or within the validity time period of the first channel are same, and allocations of uplink transmission resources and downlink transmission resources in the other part of the first time units, within the first channel transmission periodicity or within the validity time period of the first channel are different from each other.

Optionally the allocation information of the uplink transmission resource and the downlink transmission resource indicates at least two of following symbol positions: a symbol for uplink transmission, a symbol for downlink transmission, or a symbol for a guard period; or the allocation information of the uplink transmission resource and the downlink transmission resource indicates one of a plurality of predefined uplink-downlink allocation structures.

Optionally the allocation information of the uplink transmission resource and the downlink transmission resource indicates resource positions of the uplink transmission resource and the downlink transmission resource in frequency domain.

Optionally before the first channel is transmitted over the preset time-frequency resource within the first channel transmission periodicity according to the first channel transmission periodicity, the method further includes: allocating the uplink transmission resource and the downlink transmission resource within the first channel transmission periodicity or within the validity time period of the first channel, according to a current amount of an uplink traffic load and a current amount of a downlink traffic load.

An embodiment of the application provides an apparatus for allocating an uplink transmission resource and a downlink transmission resource, the apparatus including: a transmitting module configured to transmit a first channel over a preset time-frequency resource within a first channel transmission periodicity according to the first channel transmission periodicity, wherein the first channel at least notifies allocation information of an uplink transmission resource and a downlink transmission resource within the first channel transmission periodicity, or within a validity time period of the first channel.

Optionally the first channel transmission periodicity is preconfigured or predefined, and a length thereof is N1 sub-frames or N2 symbols or N3 slots or N4 first time units or N5 micro slots, wherein all of N1, N2, N3, N4, and N5 are integers greater than or equal to 1, and a length of a first time unit is predefined as B1 sub-frames or B2 symbols or B3 slots or B4 micro slots, wherein all of B1, B2, B3, and B4 are integers greater than or equal to 1; or the validity time period of the first channel is preconfigured or predefined, and a length thereof is M1 sub-frames or M2 symbols or M3 slots or M4 first time units or M5 micro slots, wherein all of M1, M2, M3, M4, and M5 are integers greater than or equal to 1, and a length of a first time unit is predefined as B1 sub-frames or B2 symbols or B3 slots or B4 micro slots, wherein all of B1, B2, B3, and B4 are integers greater than or equal to 1.

Optionally the preset time-frequency resource is located in a first symbol or first K1 symbols within the first channel transmission periodicity in time domain, wherein K1 is an integer greater than or equal to 1.

Optionally the preset time-frequency resource is located in preset K2 Sub-Carriers (SCs) or Resource Elements (REs) or Resource Units (RUs) in frequency domain, wherein K2 is an integer greater than or equal to 1, an RU is a resource region occupying X1 symbols in time domain and X2 SCs or X2 REs in frequency domain, the X2 SCs or the X2 REs are consecutive or inconsecutive in frequency domain, and both X1 and X2 are integers greater than or equal to 1.

Optionally the preset time-frequency resource is consecutive in frequency domain; or the preset time-frequency resource is dispersed within a system bandwidth or within a bandwidth corresponding to downlink transmission under a predefined rule in frequency domain.

Optionally the preset time-frequency resource is distributed uniformly within the bandwidth with a preset granularity in frequency domain; or the preset time-frequency resource is distributed at a position of a highest frequency or a lowest frequency or a central frequency within the bandwidth in frequency domain.

Optionally the first channel at least notifies the allocation information of the uplink transmission resource and the downlink transmission resource within the first channel transmission periodicity, or within the validity time period of the first channel as follows: the first channel at least notifies allocation information of an uplink transmission resource and a downlink transmission resource in each first time unit, within the first channel transmission periodicity or within the validity time period of the first channel, wherein a length of the first time unit is predefined as B1 sub-frames or B2 symbols or B3 slots or B4 micro slots, wherein all of B1, B2, B3, and B4 are integers greater than or equal to 1.

Optionally allocations of uplink transmission resources and downlink transmission resources in respective first time units, within the first channel transmission periodicity or within the validity time period of the first channel are same; or allocations of uplink transmission resources and downlink transmission resources in respective first time units, within the first channel transmission periodicity or within the validity time period of the first channel are different from each other; or allocations of uplink transmission resources and downlink transmission resources in a part of first time units, within the first channel transmission periodicity or within the validity time period of the first channel are same; and allocations of uplink transmission resources and downlink transmission resources in the other part of the first time units, within the first channel transmission periodicity or within the validity time period of the first channel are different from each other.

Optionally the allocation information of the uplink transmission resource and the downlink transmission resource indicates at least two of following symbol positions: a symbol for uplink transmission, a symbol for downlink transmission, or a symbol for a guard period; or the allocation information of the uplink transmission resource and the downlink transmission resource indicates one of a plurality of predefined uplink-downlink allocation structures.

Optionally the allocation information of the uplink transmission resource and the downlink transmission resource indicates resource positions of the uplink transmission resource and the downlink transmission resource in frequency domain.

Optionally the apparatus further includes: an allocating module configured, before the first channel is transmitted over the preset time-frequency resource within the first channel transmission periodicity according to the first channel transmission periodicity, to allocate the uplink transmission resource and the downlink transmission resource within the first channel transmission periodicity or within the validity time period of the first channel, according to a current amount of an uplink traffic load and a current amount of a downlink traffic load.

Optionally the apparatus is a base station or a terminal.

An embodiment of the application provides another apparatus for allocating an uplink transmission resource and a downlink transmission resource, the apparatus including a processor, a memory, a transceiver, and a bus interface, wherein the processor is configured to read and execute programs in the memory to: transmit a first channel over a preset time-frequency resource within a first channel transmission periodicity according to the first channel transmission periodicity, wherein the first channel at least notifies allocation information of an uplink transmission resource and a downlink transmission resource within the first channel transmission periodicity, or within a validity time period of the first channel.

In the embodiments above of the application, a first channel is transmitted over a preset time-frequency resource within a first channel transmission periodicity according to the first channel transmission periodicity, and since the first channel at least notifies allocation information of an uplink transmission resource and a downlink transmission resource within the first channel transmission periodicity or within a validity time period of the first channel, the uplink transmission resource and the downlink transmission resource can be allocated and notified dynamically.

DETAILED DESCRIPTION OF THE EMBODIMENTS

As there is a growing demand for mobile communication traffic, the ITU, and other organizations have defined the performance of a shorter user-plane delay as required for future mobile communication systems. The performance of a shorter user-plane delay is generally achieved by reducing the length of a Transmission Time Interval (TTI). Furthermore as there is a dynamically varying traffic demand, the amounts of uplink and downlink traffic vary therewith, and in order to make better use of spectrum resources, embodiments of the application propose a solution of dynamic allocation of an uplink transmission resource and a downlink transmission resource, and in an application of the embodiments of the application to an LTE system, the uplink transmission resource and the downlink transmission resource can be allocated dynamically within a sub-frame in the LTE system to thereby be better adapted to a dynamically varying demand for an amount of uplink and downlink traffic, and to improve the utilization ratio of spectrum resources.

In the embodiments of the application, a base station can be an Evolutional Node B (eNB, or e-NodeB), a macro eNB, a micro eNB (also referred to as a small eNB), a pico eNB, an Access Point (AP), or a Transmission Point (TP), in an LTE system, a base station in a next generation of wireless communication system, etc., or the base station can be conceptualized as including cells or sectors, although the embodiments of the application will not be limited thereto.

In the embodiments of the application, a terminal can be a handheld device, an on-vehicle device, a wearable device, a computing device, or another processing device connected with a wireless modem, and various forms of User Equipment (UE), Mobile Stations (MSs), terminals, terminal equipment, etc., with a wireless communication function although the embodiments of the application will not be limited thereto.

In the embodiments of the application, the LTE system can be regarded as corresponding to the $3^{rd}$ Generation Partnership Project (3GPP) Release 8 (Rel-8 or R8), Release 9 (Rel-9 or R9), Release 10 (Rel-10 or R10), and Releases subsequent thereto; and the LTE network can be structured as a macro cellular, a micro cellular, a pico cellular, a femto cellular, a network including repeaters and forwarding nodes, or various hybrid network structures (including one or more of the macro cellular, the micro cellular, the pico cellular, the femto cellular, and the repeaters and the forwarding nodes), etc., although the embodiments of the application will not be limited thereto.

The embodiments of the application will be described below in details with reference to the drawings.

Figure 1:
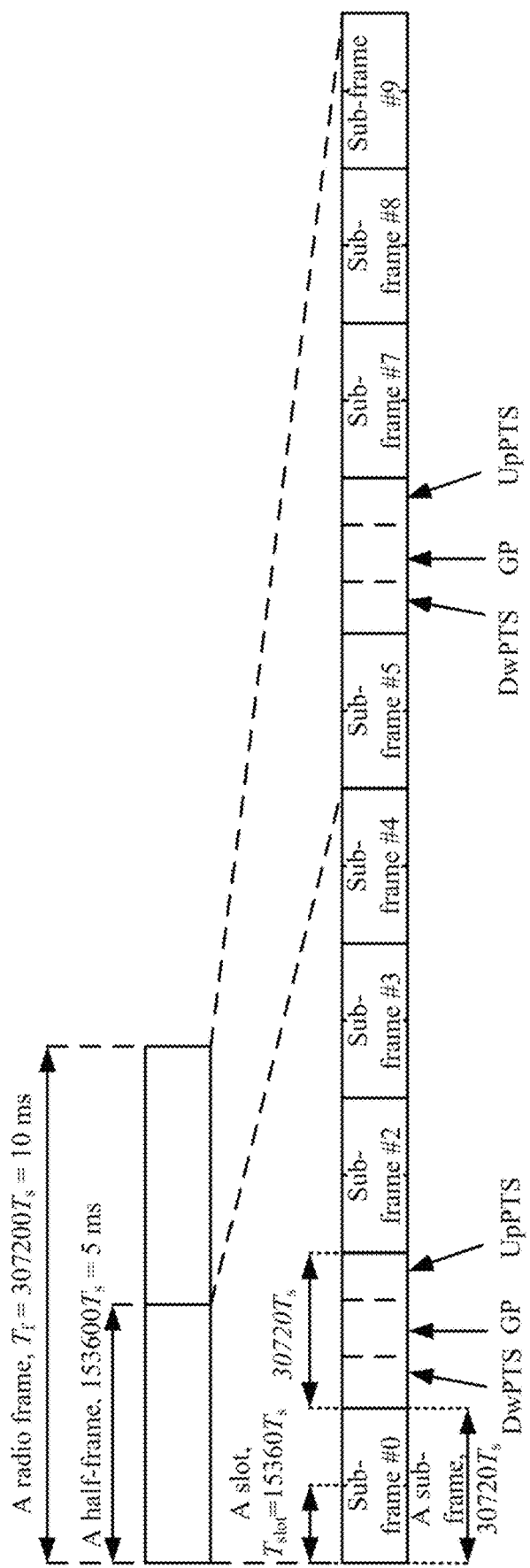
FIG. 1 is a schematic diagram of a frame structure in an LTE TDD system in the prior art.
Figure 2:
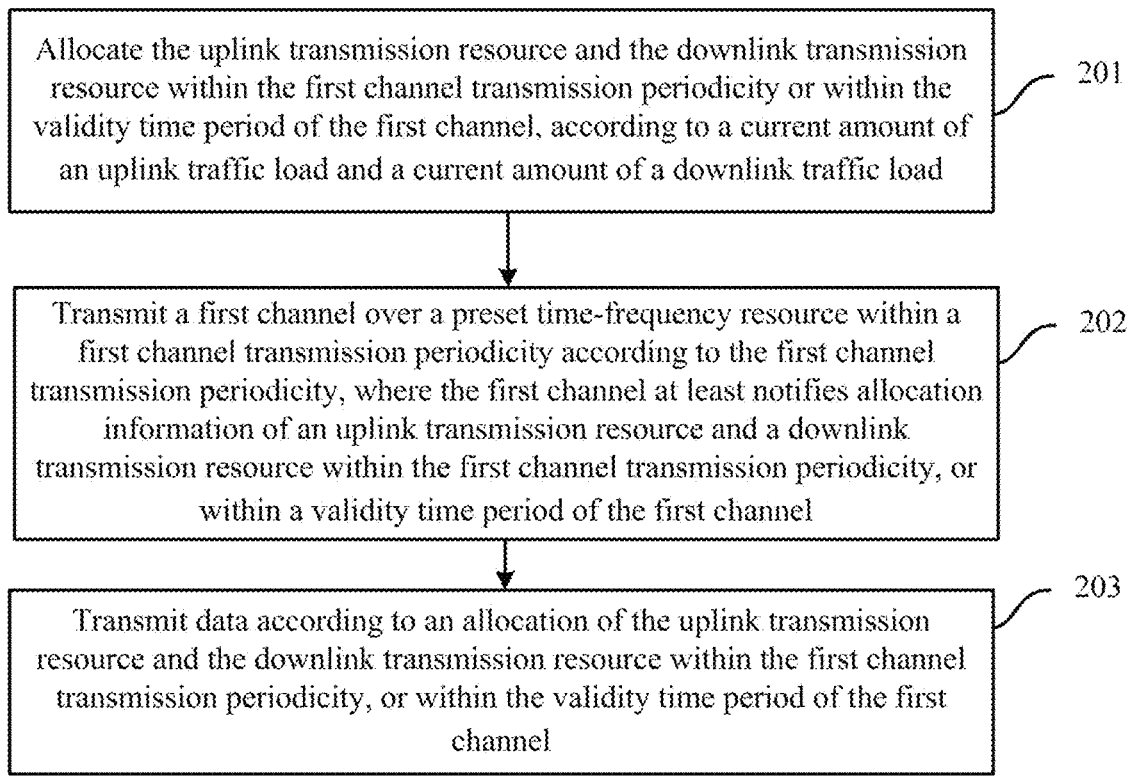
FIG. 2 is a schematic flow chart of allocating an uplink transmission resource and a downlink transmission resource at a network side according to an embodiment of the application.

Referring to FIG. 2 which is a schematic flow chart of allocating an uplink transmission resource and a downlink transmission resource at a network side according to an embodiment of the application, the flow can be performed by a base station.

As illustrated, the flow can include the following operations.

The operation 202 is to transmit (or send) a first channel over a preset time-frequency resource within a first channel transmission periodicity according to the first channel transmission periodicity, where the first channel at least notifies allocation information of an uplink transmission resource and a downlink transmission resource within the first channel transmission periodicity, or within a validity time period of the first channel.

Here the first channel can be a newly designed channel, or can be an existing channel in the existing LTE system, although the embodiments of the application will not be limited thereto.

Both a radio frame and a sub-frame defined in the LTE system can be used for a short TTI transmission, or only a part of sub-frames can be used for a short TTI transmission. An allocation of an uplink transmission resource and a downlink transmission resource with a granularity of a symbol can be supported in a sub-frame which can be used for a short TTI transmission. In this embodiment, the first channel transmission periodicity includes at least one sub-frame that can be used for the short TTI transmission, and the uplink transmission resource and the downlink transmission resource are allocated in the sub-frame(s) that can be used for the short TTI transmission; and if the first channel transmission periodicity includes a sub-frame which cannot be used for the short TTI transmission, then the uplink transmission resource and the downlink transmission resource will be not allocated in the sub-frame(s) which cannot be used for the short TTI transmission.

Here the allocation information of the uplink transmission resource and the downlink transmission resource can indicate resource positions of the uplink transmission resource and the downlink transmission resource in frequency domain, where a resource position of the uplink transmission resource in frequency domain and a resource position of the downlink transmission resource in frequency domain are the same or different; and a resource position is such a region in frequency domain that occupies a part or all of a system bandwidth.

Furthermore before the operation 201 in the flow as illustrated in FIG. 2, the flow can further include the following operation.

The operation 201 is to allocate the uplink transmission resource and the downlink transmission resource within the first channel transmission periodicity or within the validity time period of the first channel, according to a current amount of an uplink traffic load and a current amount of a downlink traffic load.

Here the uplink transmission resource and the downlink transmission resource can be allocated dynamically according to the varying amounts of uplink and downlink traffic loads. If the amount of the uplink traffic load is greater than the amount of the downlink traffic load, then more uplink transmission resources will be allocated than downlink transmission resources, or if the amount of the downlink traffic load is greater than the amount of the uplink traffic load, then more downlink transmission resources will be allocated than uplink transmission resources.

Furthermore after the operation 202 in the flow as illustrated in FIG. 2, the flow can further include the following operation.

The operation 203 is to transmit data according to an allocation of the uplink transmission resource and the downlink transmission resource within the first channel transmission periodicity, or within the validity time period of the first channel. Particularly uplink transmission is performed over the uplink transmission resource, and downlink transmission is performed over the downlink transmission resource.

As can be apparent from the flow as illustrated in FIG. 2, the first channel is transmitted over the preset time-frequency resource within the first channel transmission periodicity according to the first channel transmission periodicity, and since the first channel at least notifies allocation information of the uplink transmission resource and the downlink transmission resource within the first channel transmission periodicity or within the validity time period of the first channel, the uplink transmission resource and the downlink transmission resource can be allocated dynamically.

In some embodiments of the application, the first channel transmission periodicity is preconfigured or predefined, and a length thereof is N1 sub-frames or N2 symbols, where N1 and N2 are integers greater than or equal to 1; and/or the validity time period of the first channel is preconfigured or predefined, and a length thereof is M1 sub-frames or M2 symbols, where M1 and M2 are integers greater than or equal to 1.

For example, the validity time period of the first channel is preconfigured as A1 symbols or A2 sub-frames or A3 slots or A4 micro slots (i.e. mini-slots), after the first channel is transmitted (that is, a symbol or a sub-frame or a slot or a micro slot in which the first channel is transmitted is precluded) or including a symbol where the first channel is transmitted; that is, the allocation information of the uplink transmission resource and the downlink transmission resource configured in the first channel is valid in said time period. And if the validity time period is greater than the transmission periodicity, and for example, includes a plurality of transmission periodicities, then a plurality of first channels transmitted in the validity time period may indicate the same information, where a micro-slot refers to a time unit predefined or preconfigured as including X (X is an integer greater than or equal to 1) symbols. Of course, the allocation information of the uplink transmission resource and the downlink transmission resource can alternatively be determined according to information indicated in the last first channel received within the validity time period.

For example, the validity time period is two slots including a slot in which the first channel is transmitted, and the first channel transmission periodicity is one slot, that is, a first channel is transmitted in each slot, so the allocation information of the uplink transmission resource and the downlink transmission resource in the second slot is determined according to information indicated in the second transmitted first channel.

In another example, the validity time period can alternatively be defined so that a first channel transmitted in a current slot indicates allocation information of an uplink transmission resource and a downlink transmission resource in a next slot, and at this time, the transmission periodicity can alternatively be defined as each slot, so a first channel transmitted in a slot i indicates allocation information of an uplink transmission resource and a downlink transmission resource in a slot i+1.

In still another example, the validity time period can alternatively be defined so that a first channel transmitted in a current slot indicates allocation information of an uplink transmission resource and a downlink transmission resource in each of a plurality of slots after the current slot, and at this time, if the transmission periodicity is shorter than the validity time period, and for example, a first channel is transmitted in each slot, then for three adjacent slots, the third slot belongs to both a validity time period of a first channel transmitted in the first slot, and a validity time period of a first channel transmitted in the second slot, and at this time, the allocation information of the uplink transmission resource and the downlink transmission resource in the third slot may be determined according to indication information in the last received first channel.

As described above, both the radio frame and the sub-frame defined in the LTE system can be used for the short TTI transmission, or only a part of sub-frames can be used for the short TTI transmission. If only a part of sub-frames defined in the LTE system can be used for the short TTI transmission, then the first channel transmission periodicity may be determined according to the position(s) of the sub-frame(s) that can be used for the short TTI transmission, and for example, in the case that only a sub-frame 2 and a sub-frame 3 can be used for the short TTI transmission, if the first channel transmission periodicity is only determined according to the sub-frame(s) which can be used for the short TTI transmission, then it may be designed as a periodicity of two sub-frames or 2 ms, and if the first channel transmission periodicity is determined according to all the sub-frames including sub-frame(s) which cannot be used for the short TTI transmission, then the first channel transmission periodicity may be set to 10 sub-frames or 10 ms. That is, the first channel transmission periodicity may be extended to control a correct configuration of a transmission position of a control channel, and the sub-frame(s) which cannot be used for the short TTI transmission within the periodicity will be skipped, so that allocations of uplink transmission resources and downlink transmission resources in two sub-frames are notified within a transmission periodicity. If there is a unit of a slot or a unit of a first time unit, then the same process as the process above in a unit of a sub-frame will apply thereto.

In some embodiments of the application, a time-frequency resource, in the first channel, for transmitting the allocation information of the uplink transmission resource and the downlink transmission resource can be predefined, or can be notified by a base station. Particularly the time-frequency resource can be located in the first symbol or first K1 symbols within the first channel transmission periodicity in time domain, where K1 is an integer greater than or equal to 1. The time-frequency resource can be located in preset K2 Sub-Carriers (SCs) or K2 Resource Elements (REs) or K2 Resource Units (RUs) in frequency domain, where K2 is an integer greater than or equal to 1, and the particular value thereof can be predefined or preconfigured. Where an RU is a resource region occupying X1 symbols in time domain and X2 SCs or X2 REs in frequency domain, the X2 SCs or the X2 REs are consecutive or inconsecutive in frequency domain, both X1 and X2 are integers greater than or equal to 1, and their particular values can be predefined or preconfigured. In a particular implementation, the quantity of symbols occupied in time domain, and the quantity of SCs or REs or RUs occupied in frequency domain by the time-frequency resource can be determined according to the information amount of the allocation information of the uplink transmission resource and the downlink transmission resource to be transmitted.

In some embodiments of the application, the time-frequency resource, in the first channel, for carrying the allocation information of the uplink transmission resource and the downlink transmission resource can be consecutive in frequency domain, or can be dispersed within a system bandwidth or within a bandwidth corresponding to downlink transmission under a predefined rule. More particularly the time-frequency resource can be distributed uniformly within the bandwidth with a preset granularity in frequency domain, and for example, A (A is an integer greater than 1) SCs or REs or RUs are grouped together, thus resulting in K2/A groups, and the respective groups are distributed within the bandwidth above at a uniform interval; or can alternatively be distributed at a position of the highest frequency or the lowest frequency or the central frequency within the bandwidth in frequency domain.

In some embodiments of the application, the first channel at least notifies allocation information of an uplink transmission resource and a downlink transmission resource in each sub-frame, within the first channel transmission periodicity or within the validity time period of the first channel; or the first channel at least notifies allocation information of an uplink transmission resource and a downlink transmission resource in each first time unit, within the first channel transmission periodicity or within the validity time period of the first channel. Where a length of the first time unit is predefined as B1 sub-frames or B2 symbols, where B1 and B2 are integers greater than or equal to 1. For example, B1 sub-frames are grouped together, or B2 symbols are grouped together, so that the transmission periodicity is divided into a plurality of first time units, and the allocation information indicates an allocation of the uplink transmission resource and the downlink transmission resource in each first time unit.

Here an allocation scheme of the uplink transmission resource and the downlink transmission resource in each first time unit, within the first channel transmission periodicity or within the validity time period of the first channel can be one of the following schemes.

In a first scheme, allocations of uplink transmission resources and downlink transmission resources in respective first time units, within the first channel transmission periodicity or within the validity time period of the first channel are same.

In a second scheme, allocations of uplink transmission resources and downlink transmission resources in respective first time units, within the first channel transmission periodicity or within the validity time period of the first channel are different from each other.

In a third scheme, allocations of uplink transmission resources and downlink transmission resources in a part of first time units, within the first channel transmission periodicity or within the validity time period of the first channel are same; and allocations of uplink transmission resources and downlink transmission resources in the other part of the first time units, within the first channel transmission periodicity or within the validity time period of the first channel are different from each other.

Furthermore in the first scheme above, the allocation of the uplink transmission resource and the downlink transmission resource can be notified only with the unit of a slot or the unit of a first time unit; and in the second scheme or the third scheme, where different allocations of uplink transmission resources and downlink transmission resources are configured in different sub-frames or different first time units, which can be used for the short TTI transmission, within a first channel transmission periodicity, the allocations of uplink transmission resources and downlink transmission resources can be notified separately for respective sub-frames or respective first time units without departing from the scope of the application.

As described above, the uplink transmission resource and the downlink transmission resource can be allocated with the granularity of a symbol, that is, the uplink transmission resource or the downlink transmission resource can include one or more symbols, and correspondingly the allocation information of the uplink transmission resource and the downlink transmission resources can indicate at least two of the following symbol positions.

A symbol for uplink transmission; for example, the symbol for uplink transmission can include P1 consecutive symbols, where the P1 consecutive symbols constitute a time duration for uplink transmission; or the symbol for uplink transmission can include a plurality of groups of consecutive symbols, where each group of consecutive symbols can constitute a time duration for uplink transmission, and different time durations for uplink transmission are inconsecutive; and P1 is an integer greater than or equal to 0.

A symbol for downlink transmission; for example, the symbol for downlink transmission can include P2 consecutive symbols, where the P2 consecutive symbols constitute a time duration for downlink transmission; or the symbol for downlink transmission can include a plurality of groups of consecutive symbols, where each group of consecutive symbols can constitute a time duration for downlink transmission, and different time durations for downlink transmission are inconsecutive; and P2 is an integer greater than or equal to 0.

A symbol for a guard period.

Furthermore if the same allocation of the uplink transmission resource and the downlink transmission resource is configured in each first time unit, within the first channel transmission periodicity or within the validity time period of the first channel, then configuration information in the first channel may include allocation information of an uplink transmission resource and a downlink transmission resource in only one sub-frame or one first time unit to thereby lower an overhead of signaling.

For example, the allocation of the uplink transmission resource and the downlink transmission resource can indicate which part of symbols in a sub-frame is used for downlink transmission, which part of the symbols is used for uplink transmission, and which part of the symbols is used for a guard period. Correspondingly the allocation information of the uplink transmission resource and the downlink transmission resource can indicate the positions of at least two of the three parts of the symbols. When only a set of symbols for downlink transmission, and a set of symbols for uplink transmission, in one sub-frame or one first time unit are indicated, a terminal can determine implicitly a set of symbols, for a guard period, in one sub-frame or one first time unit according to the total quantity of symbols in one sub-frame or one first time unit; when only a set of symbols for downlink transmission, and a set of symbols for a guard period, in one sub-frame or one first time unit are indicated, a terminal can determine implicitly a set of symbols, for uplink transmission, in one sub-frame or one first time unit according to the total quantity of symbols in one sub-frame or one first time unit; or when only a set of symbols for uplink transmission, and a set of symbols for a guard period, in one sub-frame or one first time unit are indicated, a terminal can determine implicitly a set of symbols, for downlink transmission, in one sub-frame or one first time unit according to the total quantity of symbols in one sub-frame or one first time unit.

In another example, the allocation information of the uplink transmission resource and the downlink transmission resource can alternatively indicate one of a plurality of predefined uplink-downlink allocation structures, where an uplink-downlink allocation structure can be defined in a unit of one sub-frame, or can be defined in a unit of a plurality of sub-frames, or can be defined in a unit of one first time unit, or can be defined in a unit of a plurality of first time units. In an example, the uplink-downlink allocation structures can be partially downlink and partially uplink structures, where there are different uplink-downlink allocation proportions of different structures. In another example, the uplink-downlink allocation structures can include an all-downlink structure, an all-uplink structure, and a partially downlink and partially uplink structure, where the partially downlink and partially uplink structure can be further categorized into a primarily downlink structure (where there are a larger quantity of symbols in a downlink component of the structure, and a smaller quantity of symbols in an uplink component thereof), and a primarily uplink structure (where there are a larger quantity of symbols in an uplink component of the structure, and a smaller quantity of symbols in a downlink component thereof). For a partially downlink and partially uplink structure, a plurality of structures including different combinations of the quantity of downlink symbols, and the quantity of uplink symbols can be predefined, and the allocation information of the uplink transmission resource and the downlink transmission resource can indicate one of the structures; and furthermore for a primarily downlink or primarily uplink structure, also a plurality of structures including different combinations of the quantity of downlink symbols, and the quantity of uplink symbols can be predefined, and the allocation information of the uplink transmission resource and the downlink transmission resource can indicate one of the structures.

Figure 3:
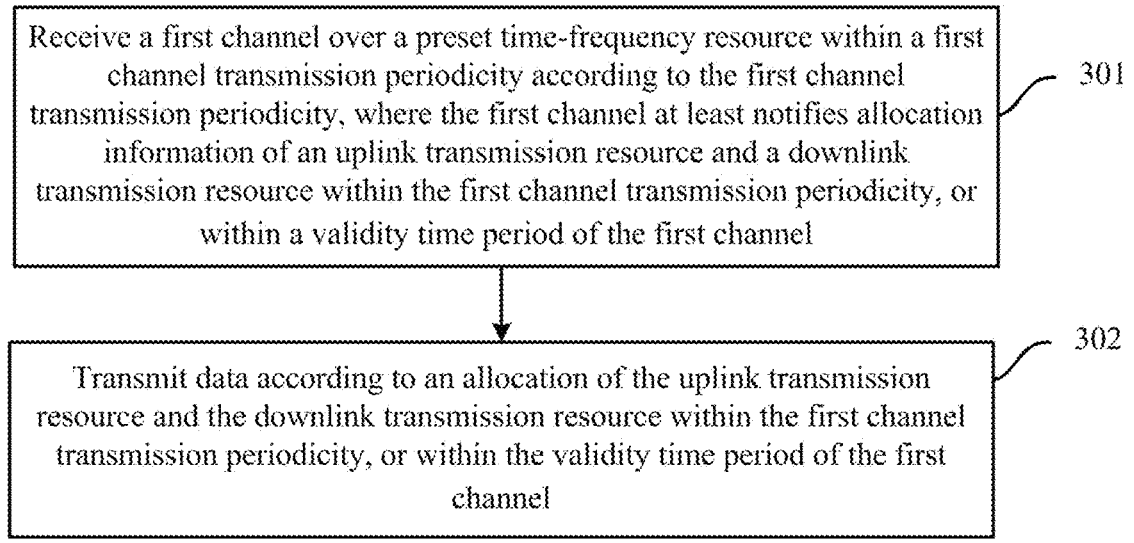
FIG. 3 is a schematic flow chart of allocating an uplink transmission resource and a downlink transmission resource at a terminal side according to an embodiment of the application.

Referring to FIG. 3 which is a schematic flow chart of allocating an uplink transmission resource and a downlink transmission resource at a terminal side according to an embodiment of the application, the flow can be performed by a terminal.

As illustrated, the flow can include the following operations.

The operation 301 is to receive a first channel over a preset time-frequency resource within a first channel transmission periodicity according to the first channel transmission periodicity, where the first channel at least notifies allocation information of an uplink transmission resource and a downlink transmission resource within the first channel transmission periodicity, or within a validity time period of the first channel.

Both a radio frame and a sub-frame defined in an LTE system can be used for a short TTI transmission, or only a part of sub-frames can be used for a short TTI transmission. An allocation of an uplink transmission resource and a downlink transmission resource with a granularity of a symbol can be supported in a sub-frame which can be used for the short TTI transmission. In this embodiment, the first channel transmission periodicity includes at least one sub-frame that can be used for the short TTI transmission, and the uplink transmission resource and the downlink transmission resource are allocated in the sub-frame(s) that can be used for the short TTI transmission; and if the first channel transmission periodicity includes a sub-frame which cannot be used for the short TTI transmission, then the uplink transmission resource and the downlink transmission resource will be not allocated in the sub-frame(s) which cannot be used for the short TTI transmission.

Here the allocation information of the uplink transmission resource and the downlink transmission resource can indicate resource positions of the uplink transmission resource and the downlink transmission resource in frequency domain, where a resource position of the uplink transmission resource in frequency domain and a resource position of the downlink transmission resource in frequency domain are the same or different, and a resource position is such a region in frequency domain that occupies a part or all of a system bandwidth.

Furthermore after the operation 301 in the flow as illustrated in FIG. 3, the flow can further include the following operation.

The operation 302 is to transmit data according to an allocation of the uplink transmission resource and the downlink transmission resource within the first channel transmission periodicity, or within the validity time period of the first channel. Particularly uplink transmission is performed over the uplink transmission resource, and downlink transmission is performed over the downlink transmission resource.

Reference can be made to the previous embodiment for a related description of allocation and notification of the uplink transmission resource and the downlink transmission resource in the flow as illustrated in FIG. 3, so a repeated description thereof will be omitted here.

As can be apparent from the flow as illustrated in FIG. 3, the first channel is transmitted over the preset time-frequency resource within the first channel transmission periodicity according to the first channel transmission periodicity, and since the first channel at least notifies allocation information of the uplink transmission resource and the downlink transmission resource within the first channel transmission periodicity, or within the validity time period of the first channel, the uplink transmission resource and the downlink transmission resource can be allocated dynamically.

It shall be noted that in the embodiments of the application, when a part of symbols (e.g., the first symbol or the first K1 symbols) within the first channel transmission periodicity is assumed to be used for downlink transmission all the time, for example, then optionally the notified allocation information of the uplink transmission resource and the downlink transmission resource may not include the symbol(s) assumed to be used for downlink transmission all the time to thereby further reduce the quantity of bits in the signaling. And when a part of symbols (e.g., the a-th symbol, where a=3 or 4, for example, or the last symbol, or the last K1 symbols) in each first channel transmission periodicity is assumed to be used for uplink transmission all the time, then optionally the notified allocation information of the uplink transmission resource and the downlink transmission resource may not include the symbol(s) assumed to be used for uplink transmission all the time to thereby further reduce the quantity of bits in the signaling.

In order to make the embodiments of the application more apparent, they will be described below in connection with a particular application scenario thereof by way of an example.

In this application scenario, a transmission periodicity of a first channel is two sub-frames, that is, the transmission periodicity is 2 ms, for example.

At a base station side, a position in time domain at which the first channel is transmitted is determined so that the first channel is transmitted at a specific position in frequency domain (e.g., K2 SCs or REs or RUs at an intermediate or a lower or a higher frequency in frequency domain, or K2 SCs or REs or RUs dispersed in a downlink transmission bandwidth), in the first symbol in the transmission periodicity of the first channel.

Particularly the base station can determine the allocation of the uplink transmission resource and the downlink transmission resource in a sub-frame according to current uplink and downlink traffic loads. Where when there is a larger amount of downlink traffic, more symbols are allocated for downlink transmission, and for example, the first channel is transmitted in the first symbol in the sub-frame #0, and it is indicated that the first symbol to the ninth symbol in each sub-frame (i.e., the sub-frame #0 and the sub-frame 1) in the transmission periodicity are used for downlink transmission, i.e., are downlink transmission resources; and the tenth symbol and the eleventh symbol in each sub-frame are guard periods. And when there is a larger amount of uplink traffic, more symbols are allocated for uplink transmission, and for example, the first channel is transmitted in the first symbol in the sub-frame #2, and it is indicated that the first symbol to the fourth symbol in each sub-frame (i.e., the sub-frame #2 and the sub-frame 3) in the transmission periodicity are used for downlink transmission, i.e., are downlink transmission resources, and the fifth symbol and the sixth symbol in each sub-frame are guard periods.

Figure 4:
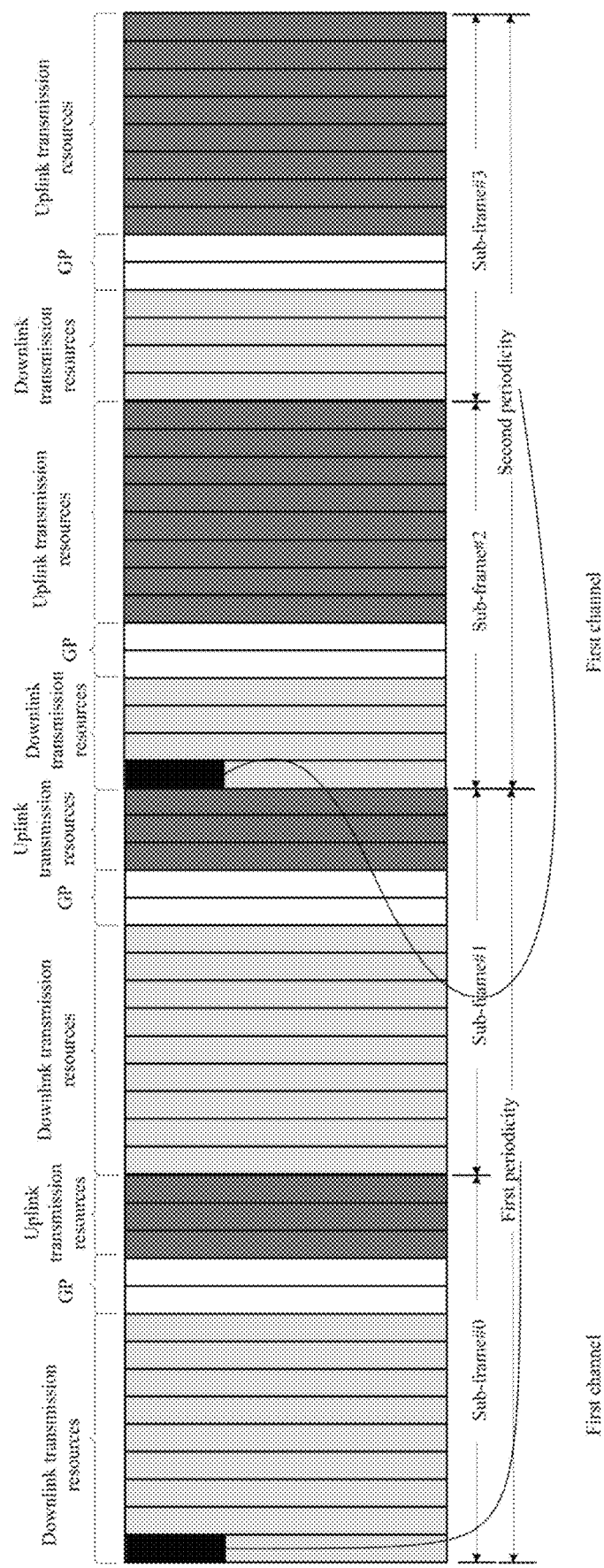
FIG. 4 is a schematic diagram of allocated uplink transmission resources and downlink transmission resources according to an embodiment of the application.

At the terminal side, the terminal receives the first channel at the specific position in frequency domain (the same as the transmission position at the base station side), in the first symbol within the first channel transmission periodicity as agreed on according to the transmission periodicity, parses the information carried in the first channel, and determines the allocation of the uplink transmission resource and the downlink transmission resource. As illustrated in FIG. 4, for example, the terminal receives the first channel in the first symbol in the sub-frame #0, and determines that the first symbol to the ninth symbol in each sub-frame (i.e., the sub-frame #0 and the sub-frame 1) in the transmission periodicity are used for downlink transmission, i.e., are downlink transmission resources, where the terminal only performs downlink transmission in these symbols; determines the tenth symbol and the eleventh symbol in each sub-frame as guard periods, and determines that there are fourteen symbols in a sub-frame, according to the current system configuration of a normal CP; and further determines that the twelfth symbol to the fourteenth symbol in each sub-frame are used for uplink transmission, i.e., are uplink transmission resources, where the terminal only performs uplink transmission in these symbols; and the terminal transmits uplink and downlink traffic respectively in the sub-frame #0 and the sub-frame #1 according to the allocation of the uplink transmission resource and the downlink transmission resource. The terminal receives the first channel again in the sub-frame #2, and determines that the first symbol to the fourth symbol in each sub-frame (i.e., the sub-frame #2 and the sub-frame 3) in the transmission periodicity are used for downlink transmission, i.e., are downlink transmission resources, where the terminal only performs downlink transmission in these symbols; determines the fifth symbol and the sixth symbol in each sub-frame as guard periods, and determines that there are fourteen symbols in a sub-frame, according to the current system configuration of a normal CP; and further determines that the seventh symbol to the fourteenth symbol in each sub-frame are used for uplink transmission, i.e., are uplink transmission resources, where the terminal only performs uplink transmission in these symbols; and the terminal transmits uplink and downlink traffic respectively in the sub-frame #2 and the sub-frame #3 according to the allocation of the uplink transmission resource and the downlink transmission resource. This process is repeated.

Furthermore if the validity time period of the first channel is preconfigured, and for example, the validity time period is configured as four sub-frames including a sub-frame in which the first channel is transmitted, that is, the allocation of the uplink transmission resource and the downlink transmission resource indicated in the first channel applies to four sub-frames, then the same process as described above will be performed except that the base station side determines the allocation of the uplink transmission resource and the downlink transmission resource in a sub-frame according to a traffic demand, and preferably since a first channel applies to four sub-frames, there is the same information in the first channels transmitted by the base station in the sub-frame 0 and the sub-frame 2, and the base station can update configuration information of the first channel in the sub-frame 4 according to an amount of service to indicate different allocation of the uplink transmission resource and the downlink transmission resource; and at the terminal side, the terminal can obtain the allocation of the uplink transmission resource and the downlink transmission resource in the sub-frames 0, 1, 2, and 3 according to configuration information of the first channel upon reception of the first channel in the sub-frame 0, and thus will not further receive any first channel in the sub-frame 2, but can receive the first channel again in the sub-frame 4 at the validity time period, thus reducing the amount of information to be received at the terminal side so as to save power.

Based upon the same technical concept, the embodiments of the application further provide a base station, and the base station can perform the flow of allocating the uplink transmission resource and the downlink transmission resource at the network side as described in the embodiments above.

Figure 5:
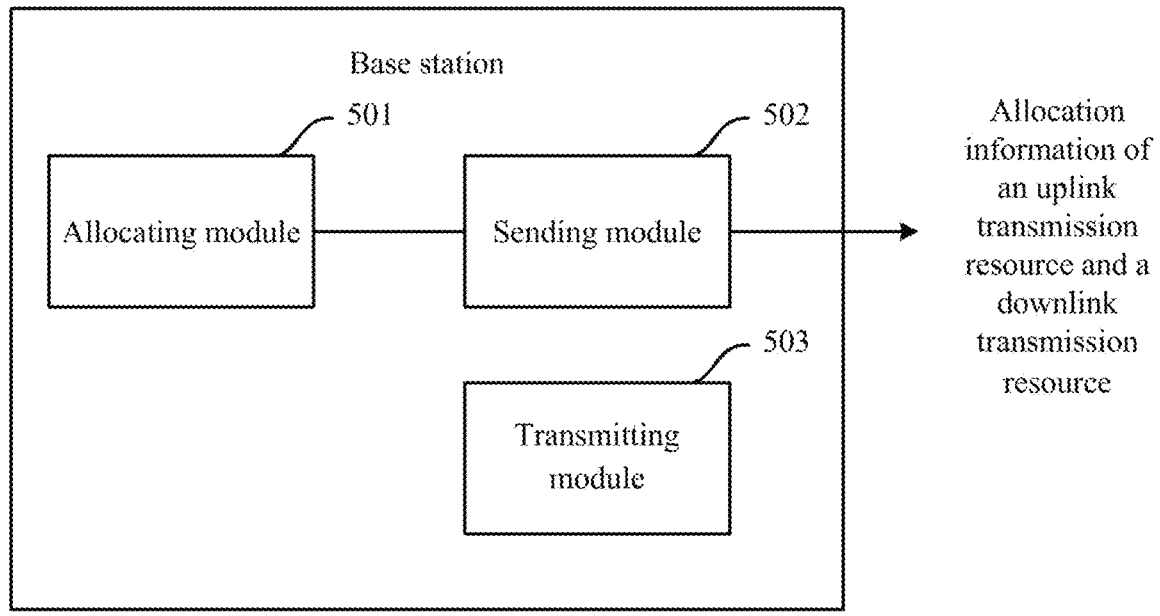
FIG. 5 is a schematic structural diagram of a base station according to an embodiment of the application.

Referring to FIG. 5 which is a schematic structural diagram of the base station according to the embodiments of the application, the base station can include a sending module 502, and furthermore, the base station can further include an allocating module 501. Furthermore the base station can further include a transmitting module 503, where: the allocating module 501 is configured to allocate an uplink transmission resource and a downlink transmission resource within a first channel transmission periodicity, or within a validity time period of a first channel according to a current amount of an uplink traffic load, and a current amount of a downlink traffic load; the sending module 502 is configured to transmit (or send) the first channel over a preset time-frequency resource within the first channel transmission periodicity according to the first channel transmission periodicity, where the first channel at least notifies allocation information of the uplink transmission resource and the downlink transmission resource within the first channel transmission periodicity, or within the validity time period of the first channel; and the transmitting module 503 is configured to transmit data according to an allocation of the uplink transmission resource and the downlink transmission resource within the first channel transmission periodicity, or within the validity time period of the first channel.

Optionally the first channel transmission periodicity is preconfigured or predefined, and a length thereof is N1 sub-frames or N2 symbols or N3 slots or N4 first time units or N5 micro slots, where all of N1, N2, N3, N4, and N5 are integers greater than or equal to 1, and a length of a first time unit is predefined as B1 sub-frames or B2 symbols or B3 slots or B4 micro slots, where all of B1, B2, B3, and B4 are integers greater than or equal to 1; and/or the validity time period of the first channel is preconfigured or predefined, and a length thereof is M1 sub-frames or M2 symbols or M3 slots or M4 first time units or M5 micro slots, where all of M1, M2, M3, M4, and M5 are integers greater than or equal to 1, and a length of a first time unit is predefined as B1 sub-frames or B2 symbols or B3 slots or B4 micro slots, where all of B1, B2, B3, and B4 are integers greater than or equal to 1.

Optionally the preset time-frequency resource is located in the first symbol or first K1 symbols within the first channel transmission periodicity in time domain, where K1 is an integer greater than or equal to 1.

Optionally the preset time-frequency resource is located in preset K2 Sub-Carriers (SCs) or Resource Elements (REs) or Resource Units (RUs) in frequency domain, where K2 is an integer greater than or equal to 1, where an RU is a resource region occupying X1 symbols in time domain, and X2 SCs or X2 REs in frequency domain, the X2 SCs or the X2 REs are consecutive or inconsecutive in frequency domain, and both X1 and X2 are integers greater than or equal to 1.

Optionally the preset time-frequency resource is consecutive in frequency domain; or the preset time-frequency resource is dispersed within a system bandwidth or within a bandwidth corresponding to downlink transmission under a predefined rule in frequency domain.

Here the preset time-frequency resource is distributed uniformly within the bandwidth with a preset granularity in frequency domain; or the preset time-frequency resource is distributed at a position of the highest frequency or the lowest frequency or the central frequency within the bandwidth in frequency domain.

Optionally the first channel at least notifies the allocation information of the uplink transmission resource and the downlink transmission resource within the first channel transmission periodicity, or within the validity time period of the first channel as follows: the first channel at least notifies allocation information of an uplink transmission resource and a downlink transmission resource in each sub-frame, within the first channel transmission periodicity or within the validity time period of the first channel; or the first channel is at least used for notifying allocation information of an uplink transmission resource and a downlink transmission resource in each first time unit, within the first channel transmission periodicity or within the validity time period of the first channel, where a length of the first time unit is predefined as B1 sub-frames or B2 symbols or B3 slots or B4 micro slots, where all of B1, B2, B3, and B4 are integers greater than or equal to 1.

Here allocations of uplink transmission resources and downlink transmission resources in respective first time units, within the first channel transmission periodicity or within the validity time period of the first channel are same; or allocations of uplink transmission resources and downlink transmission resources in respective first time units, within the first channel transmission periodicity or within the validity time period of the first channel are different from each other; or allocations of uplink transmission resources and downlink transmission resources in a part of first time units, within the first channel transmission periodicity or within the validity time period of the first channel are same, and allocations of uplink transmission resources and downlink transmission resources in the other part of the first time units, within the first channel transmission periodicity or within the validity time period of the first channel are different from each other.

Optionally the allocation information of the uplink transmission resource and the downlink transmission resource indicates at least two of the following symbol positions: a symbol for uplink transmission, a symbol for downlink transmission, and a symbol for a guard period; or the allocation information of the uplink transmission resource and the downlink transmission resource indicates one of a plurality of predefined uplink-downlink allocation structures.

Optionally the allocation information of the uplink transmission resource and the downlink transmission resource indicates resource positions of the uplink transmission resource and the downlink transmission resource in frequency domain, where a resource position of the uplink transmission resource in frequency domain and a resource position of the downlink transmission resource in frequency domain are the same or different, and a resource position is such a region in frequency domain that occupies a part or all of a system bandwidth.

Based upon the same technical concept, the embodiments of the application further provide a terminal, and the terminal can perform the flow of allocating the uplink transmission resource and the downlink transmission resource at the terminal side as described in the embodiments above.

Figure 6:
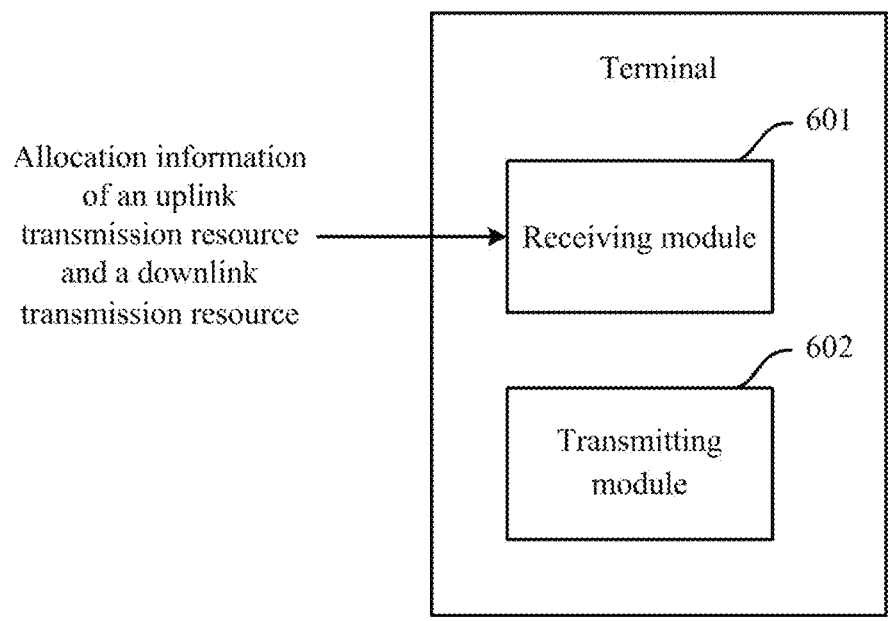
FIG. 6 is a schematic structural diagram of a terminal according to an embodiment of the application.

Referring to FIG. 6 which is a schematic structural diagram of the terminal according to the embodiments of the application, the terminal can include a receiving module 601, and furthermore the terminal can include a transmitting module 602, where: the receiving module 601 is configured to receive a first channel over a preset time-frequency resource within a first channel transmission periodicity according to the first channel transmission periodicity, where the first channel at least notifies allocation information of an uplink transmission resource and a downlink transmission resource within the first channel transmission periodicity, or within a validity time period of the first channel; and the transmitting module 602 is configured to transmit data according to an allocation of the uplink transmission resource and the downlink transmission resource within the first channel transmission periodicity, or within the validity time period of the first channel.

Optionally the first channel transmission periodicity is preconfigured or predefined, and a length thereof is N1 sub-frames or N2 symbols or N3 slots or N4 first time units or N5 micro slots, where all of N1, N2, N3, N4, and N5 are integers greater than or equal to 1, and a length of a first time unit is predefined as B1 sub-frames or B2 symbols or B3 slots or B4 micro slots, where all of B1, B2, B3, and B4 are integers greater than or equal to 1; and/or the validity time period of the first channel is preconfigured or predefined, and a length thereof is M1 sub-frames or M2 symbols or M3 slots or M4 first time units or M5 micro slots, where all of M1, M2, M3, M4, and M5 are integers greater than or equal to 1, and a length of a first time unit is predefined as B1 sub-frames or B2 symbols or B3 slots or B4 micro slots, where all of B1, B2, B3, and B4 are integers greater than or equal to 1.

Optionally the preset time-frequency resource is located in the first symbol or first K1 symbols within the first channel transmission periodicity in time domain, where K1 is an integer greater than or equal to 1.

Optionally the preset time-frequency resource is located in preset K2 Sub-Carriers (SCs) or Resource Elements (REs) or Resource Units (RUs) in frequency domain, where K2 is an integer greater than or equal to 1, where an RU is a resource region occupying X1 symbols in time domain, and X2 SCs or X2 REs in frequency domain, the X2 SCs or the X2 REs are consecutive or inconsecutive in frequency domain, and both X1 and X2 are integers greater than or equal to 1.

Optionally the preset time-frequency resource is consecutive in frequency domain; or the preset time-frequency resource is dispersed within a system bandwidth or within a bandwidth corresponding to downlink transmission under a predefined rule in frequency domain.

Here the preset time-frequency resource is distributed uniformly within the bandwidth with a preset granularity in frequency domain; or the preset time-frequency resource is distributed at a position of the highest frequency or the lowest frequency or the central frequency within the bandwidth in frequency domain.

Optionally the first channel at least notifies the allocation information of the uplink transmission resource and the downlink transmission resource within the first channel transmission periodicity, or within the validity time period of the first channel as follows: the first channel at least notifies allocation information of an uplink transmission resource and a downlink transmission resource in each sub-frame, within the first channel transmission periodicity or within the validity time period of the first channel; or the first channel at least notifies allocation information of an uplink transmission resource and a downlink transmission resource in each first time unit, within the first channel transmission periodicity or within the validity time period of the first channel, where a length of the first time unit is predefined as B1 sub-frames or B2 symbols or B3 slots or B4 micro slots, where all of B1, B2, B3, and B4 are integers greater than or equal to 1.

Here allocations of uplink transmission resources and downlink transmission resources in respective first time units, within the first channel transmission periodicity or within the validity time period of the first channel are same; or allocations of uplink transmission resources and downlink transmission resources in respective first time units, within the first channel transmission periodicity or within the validity time period of the first channel are different from each other; or allocations of uplink transmission resources and downlink transmission resources in a part of first time units, within the first channel transmission periodicity or within the validity time period of the first channel are same, and allocations of uplink transmission resources and downlink transmission resources in the other part of the first time units, within the first channel transmission periodicity or within the validity time period of the first channel are different from each other.

Optionally the allocation information of the uplink transmission resource and the downlink transmission resource indicates at least two of the following symbol positions: a symbol for uplink transmission, a symbol for downlink transmission, and a symbol for a guard period; or the allocation information of the uplink transmission resource and the downlink transmission resource indicates one of a plurality of predefined uplink-downlink allocation structures.

Optionally the allocation information of the uplink transmission resource and the downlink transmission resource indicates resource positions of the uplink transmission resource and the downlink transmission resource in frequency domain, where a resource position of the uplink transmission resource in frequency domain and a resource position of the downlink transmission resource in frequency domain are the same or different, and a resource position is such a region in frequency domain that occupies a part or all of a system bandwidth.

Based upon the same technical concept, the embodiment of the application further provides another base station, and the base station can perform the flow of allocating the uplink transmission resource and the downlink transmission resource at the network side as described in the embodiments above.

Figure 7:
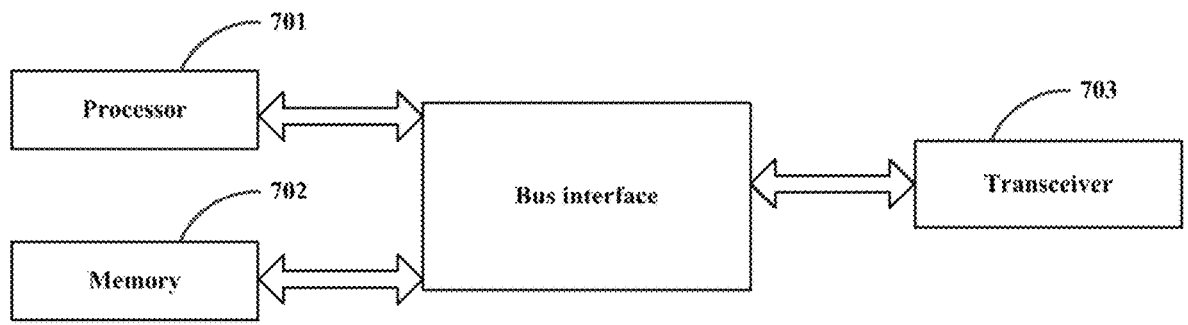
FIG. 7 is a schematic structural diagram of a base station according to another embodiment of the application.

Referring to FIG. 7 which is a schematic structural diagram of the base station according to the embodiments of the application, the base station can include a processor 701, a memory 702, a transceiver 703, and a bus interface.

The processor 701 is responsible for managing bus architecture and performing normal processes, and the memory 702 can store data for use by the processor 701 in performing operations. The transceiver 703 is configured to receive and transmit data under the control of the processor 701.

The bus architecture can include any quantity of interconnecting buses and bridges to particularly link together various circuits including one or more processors represented by the processor 701, and one or more memories represented by the memory 702. The bus architecture can further link together various other circuits, e.g., a peripheral device, a manostat, a power management circuit, etc., all of which are well known in the art, so a further description thereof will be omitted in this context. The bus interface serves as an interface. The processor 701 is responsible for managing the bus architecture and performing normal processes, and the memory 702 can store data for use by the processor 701 in performing operations.

The flow of processing a signal according to the embodiments of the application can be applied to the processor 701, or performed by the processor 701. In an implementation, the respective operations in the flow of processing a signal can be performed by integrated logic circuits in hardware, or instructions in software, in the processor 701. The processor 701 can be a general-purpose processor, a digital signal processor, an application specific integrated circuit, a field programmable gate array, or another programmable logic device, discrete gate, transistor logic device, or discrete hardware component. The respective methods, operations, and logic block diagrams disclosed in the embodiments of the application can be implemented or performed by the processor 701. Where the general-purpose processor can be a micro-processor, or can be any conventional processor, etc. The operations in the method according to the embodiments of the application can be performed directly by a hardware processor, or performed by a combination of hardware and software modules in the processor. The software module can be located in a random memory, a flash memory, a read-only memory, a programmable read-only memory, an electrically erasable and programmable memory, a register, or another storage medium known in the art. The storage medium is located in the memory 702, and the processor 701 reads the information in the memory 702, and performs the operations in the flow of processing a signal, in combination with the hardware thereof.

Particularly the processor 701 is configured to read and execute the programs in the memory 702 to: transmit (or send) a first channel over a preset time-frequency resource within a first channel transmission periodicity according to the first channel transmission periodicity, where the first channel at least notifies allocation information of an uplink transmission resource and a downlink transmission resource within the first channel transmission periodicity, or within a validity time period of the first channel.

Optionally the first channel transmission periodicity is preconfigured or predefined, and a length thereof is N1 sub-frames or N2 symbols or N3 slots or N4 first time units or N5 micro slots, where all of N1, N2, N3, N4, and N5 are integers greater than or equal to 1, and a length of a first time unit is predefined as B1 sub-frames or B2 symbols or B3 slots or B4 micro slots, where all of B1, B2, B3, and B4 are integers greater than or equal to 1; and/or the validity time period of the first channel is preconfigured or predefined, and a length thereof is M1 sub-frames or M2 symbols or M3 slots or M4 first time units or M5 micro slots, where all of M1, M2, M3, M4, and M5 are integers greater than or equal to 1, and a length of a first time unit is predefined as B1 sub-frames or B2 symbols or B3 slots or B4 micro slots, where all of B1, B2, B3, and B4 are integers greater than or equal to 1.

Optionally the preset time-frequency resource is located in the first symbol or first K1 symbols within the first channel transmission periodicity in time domain, where K1 is an integer greater than or equal to 1.

Optionally the preset time-frequency resource is located in preset K2 Sub-Carriers (SCs) or Resource Elements (REs) or Resource Units (RUs) in frequency domain, where K2 is an integer greater than or equal to 1, where an RU is a resource region occupying X1 symbols in time domain, and X2 SCs or X2 REs in frequency domain, the X2 SCs or the X2 REs are consecutive or inconsecutive in frequency domain, and both X1 and X2 are integers greater than or equal to 1.

Optionally the preset time-frequency resource is consecutive in frequency domain; or the preset time-frequency resource is dispersed within a system bandwidth or within a bandwidth corresponding to downlink transmission under a predefined rule in frequency domain.

Here the preset time-frequency resource is distributed uniformly within the bandwidth with a preset granularity in frequency domain; or the preset time-frequency resource is distributed at a position of the highest frequency or the lowest frequency or the central frequency within the bandwidth in frequency domain.

Optionally the first channel at least notifies the allocation information of the uplink transmission resource and the downlink transmission resource within the first channel transmission periodicity, or within the validity time period of the first channel as follows: the first channel at least notifies allocation information of an uplink transmission resource and a downlink transmission resource in each sub-frame, within the first channel transmission periodicity or within the validity time period of the first channel; or the first channel is at least used for notifying allocation information of an uplink transmission resource and a downlink transmission resource in each first time unit, within the first channel transmission periodicity or within the validity time period of the first channel, where a length of the first time unit is predefined as B1 sub-frames or B2 symbols or B3 slots or B4 micro slots, where all of B1, B2, B3, and B4 are integers greater than or equal to 1.

Here allocations of uplink transmission resources and downlink transmission resources in respective first time units, within the first channel transmission periodicity or within the validity time period of the first channel are same; or allocations of uplink transmission resources and downlink transmission resources in respective first time units, within the first channel transmission periodicity or within the validity time period of the first channel are different from each other; or allocations of uplink transmission resources and downlink transmission resources in a part of first time units, within the first channel transmission periodicity or within the validity time period of the first channel are same, and allocations of uplink transmission resources and downlink transmission resources in the other part of the first time units, within the first channel transmission periodicity or within the validity time period of the first channel are different from each other.

Optionally the allocation information of the uplink transmission resource and the downlink transmission resource indicates at least two of the following symbol positions: a symbol for uplink transmission, a symbol for downlink transmission, and a symbol for a guard period; or the allocation information of the uplink transmission resource and the downlink transmission resource indicates one of a plurality of predefined uplink-downlink allocation structures.

Optionally the allocation information of the uplink transmission resource and the downlink transmission resource indicates resource positions of the uplink transmission resources and the downlink transmission resources in frequency domain, where a resource position of the uplink transmission resource in frequency domain and a resource position of the downlink transmission resource in frequency domain are the same or different, and a resource position is such a region in frequency domain that occupies a part or all of a system bandwidth.

Optionally the processor 701 can be further configured, before the first channel is transmitted over the preset time-frequency resources within the first channel transmission periodicity according to the first channel transmission periodicity, to allocate the uplink transmission resource and the downlink transmission resource within the first channel transmission periodicity or within the validity time period of the first channel, according to a current amount of an uplink traffic load and a current amount of a downlink traffic load.

Based upon the same technical concept, the embodiments of the application further provide another terminal, and the terminal can perform the flow of allocating the uplink transmission resource and the downlink transmission resource at the terminal side as described in the embodiments above.

Figure 8:
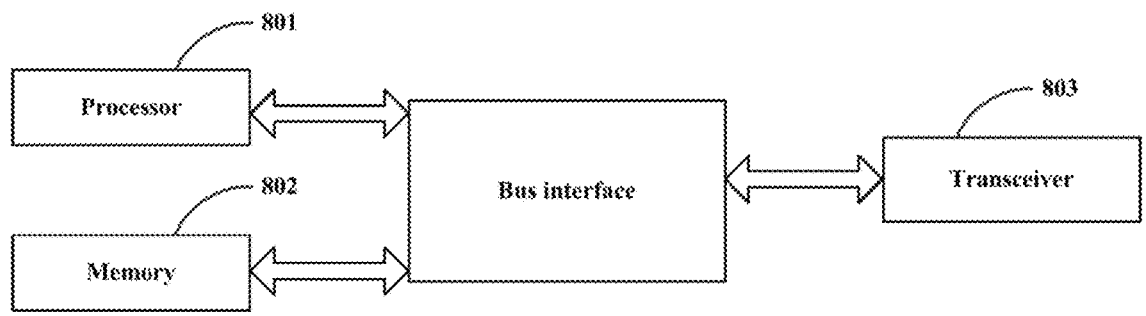
FIG. 8 is a schematic structural diagram of a terminal according to another embodiment of the application.

Referring to FIG. 8 which is a schematic structural diagram of the terminal according to the embodiments of the application, the terminal can include a processor 801, a memory 802, a transceiver 803, and a bus interface.

The processor 801 is responsible for managing bus architecture and performing normal processes, and the memory 802 can store data for use by the processor 801 in performing operations. The transceiver 803 is configured to receive and transmit data under the control of the processor 801.

The bus architecture can include any quantity of interconnecting buses and bridges to particularly link together various circuits including one or more processors represented by the processor 801, and one or more memories represented by the memory 802. The bus architecture can further link together various other circuits, e.g., a peripheral device, a manostat, a power management circuit, etc., all of which are well known in the art, so a further description thereof will be omitted in this context. The bus interface serves as an interface. The processor 801 is responsible for managing the bus architecture and performing normal processes, and the memory 802 can store data for use by the processor 801 in performing operations.

The flow of processing a signal according to the embodiments of the application can be applied to the processor 801, or performed by the processor 801. In an implementation, the respective operations in the flow of processing a signal can be performed by integrated logic circuits in hardware, or instructions in software, in the processor 801. The processor 801 can be a general-purpose processor, a digital signal processor, an application specific integrated circuit, a field programmable gate array, or another programmable logic device, discrete gate, transistor logic device, or discrete hardware component. The respective methods, operations, and logic block diagrams disclosed in the embodiments of the application can be implemented or performed by the processor 801. Where the general-purpose processor can be a micro-processor, or can be any conventional processor, etc. The operations in the method according to the embodiments of the application can be performed directly by a hardware processor, or performed by a combination of hardware and software modules in the processor. The software module can be located in a random memory, a flash memory, a read-only memory, a programmable read-only memory, an electrically erasable and programmable memory, a register, or another storage medium known in the art. The storage medium is located in the memory 802, and the processor 801 reads the information in the memory 802, and performs the operations in the flow of processing a signal, in combination with the hardware thereof.

Particularly the processor 801 is configured to read and execute the programs in the memory 802 to: receive a first channel over a preset time-frequency resource within a first channel transmission periodicity according to the first channel transmission periodicity, where the first channel at least notifies allocation information of an uplink transmission resource and a downlink transmission resource within the first channel transmission periodicity, or within a validity time period of the first channel.

Optionally the first channel transmission periodicity is preconfigured or predefined, and a length thereof is N1 sub-frames or N2 symbols or N3 slots or N4 first time units or N5 micro slots, where all of N1, N2, N3, N4, and N5 are integers greater than or equal to 1, and a length of a first time unit is predefined as B1 sub-frames or B2 symbols or B3 slots or B4 micro slots, where all of B1, B2, B3, and B4 are integers greater than or equal to 1; and/or the validity time period of the first channel is preconfigured or predefined, and a length thereof is M1 sub-frames or M2 symbols or M3 slots or M4 first time units or M5 micro slots, where all of M1, M2, M3, M4, and M5 are integers greater than or equal to 1, and a length of a first time unit is predefined as B1 sub-frames or B2 symbols or B3 slots or B4 micro slots, where all of B1, B2, B3, and B4 are integers greater than or equal to 1.

Optionally the preset time-frequency resource is located in the first symbol or first K1 symbols within the first channel transmission periodicity in time domain, where K1 is an integer greater than or equal to 1.

Optionally the preset time-frequency resource is located in preset K2 Sub-Carriers (SCs) or Resource Elements (REs) or Resource Units (RUs) in frequency domain, where K2 is an integer greater than or equal to 1, where an RU is a resource region occupying X1 symbols in time domain, and X2 SCs or X2 REs in frequency domain, the X2 SCs or the X2 REs are consecutive or inconsecutive in frequency domain, and both X1 and X2 are integers greater than or equal to 1.

Optionally the preset time-frequency resource is consecutive in frequency domain; or the preset time-frequency resource is dispersed within a system bandwidth or within a bandwidth corresponding to downlink transmission under a predefined rule in frequency domain.

Here the preset time-frequency resource is distributed uniformly within the bandwidth with a preset granularity in frequency domain; or the preset time-frequency resource is distributed at a position of the highest frequency or the lowest frequency or the central frequency within the bandwidth in frequency domain.

Optionally the first channel at least notifies the allocation information of the uplink transmission resource and the downlink transmission resource within the first channel transmission periodicity, or within the validity time period of the first channel as follows.

The first channel at least notifies allocation information of an uplink transmission resource and a downlink transmission resource in each sub-frame, within the first channel transmission periodicity or within the validity time period of the first channel.

Or the first channel at least notifies allocation information of an uplink transmission resource and a downlink transmission resource in each first time unit, within the first channel transmission periodicity or within the validity time period of the first channel, where a length of the first time unit is predefined as B1 sub-frames or B2 symbols or B3 slots or B4 micro slots, where all of B1, B2, B3, and B4 are integers greater than or equal to 1.

Here allocations of uplink transmission resources and downlink transmission resources in respective first time units, within the first channel transmission periodicity or within the validity time period of the first channel are same; or allocations of uplink transmission resources and downlink transmission resources in respective first time units, within the first channel transmission periodicity or within the validity time period of the first channel are different from each other; or allocations of uplink transmission resources and downlink transmission resources in a part of first time units, within the first channel transmission periodicity or within the validity time period of the first channel are same, and allocations of uplink transmission resources and downlink transmission resources in the other part of the first time units, within the first channel transmission periodicity or within the validity time period of the first channel are different from each other.

Optionally the allocation information of the uplink transmission resource and the downlink transmission resource indicates at least two of the following symbol positions: a symbol for uplink transmission, a symbol for downlink transmission, and a symbol for a guard period; or the allocation information of the uplink transmission resource and the downlink transmission resource indicates one of a plurality of predefined uplink-downlink allocation structures.

Optionally the allocation information of the uplink transmission resource and the downlink transmission resource indicates resource positions of the uplink transmission resource and the downlink transmission resource in frequency domain, where a resource position of the uplink transmission resource in frequency domain and a resource position of the downlink transmission resource in frequency domain are the same or different, and a resource position is such a region in frequency domain that occupies a part or all of a system bandwidth.

Those skilled in the art shall appreciate that the embodiments of the application can be embodied as a method, a system or a computer program product. Therefore the application can be embodied in the form of an all-hardware embodiment, an all-software embodiment or an embodiment of software and hardware in combination. Furthermore the application can be embodied in the form of a computer program product embodied in one or more computer useable storage mediums (including but not limited to a disk memory, a CD-ROM, an optical memory, etc.) in which computer useable program codes are contained.

The application has been described in a flow chart and/or a block diagram of the method, the device (system) and the computer program product according to the embodiments of the application. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the application have been described, those skilled in the art benefiting from the underlying inventive concept can make additional modifications and variations to these embodiments. Therefore the appended claims are intended to be construed as encompassing the preferred embodiments and all the modifications and variations coming into the scope of the application.

Evidently those skilled in the art can make various modifications and variations to the application without departing from the spirit and scope of the application. Thus the application is also intended to encompass these modifications and variations thereto so long as the modifications and variations come into the scope of the claims appended to the application and their equivalents.

What is claimed is:

1. A method for allocating an uplink transmission resource and a downlink transmission resource, the method comprising:
   transmitting a first channel over a preset time-frequency resource within a first channel transmission periodicity according to the first channel transmission periodicity, wherein the first channel at least notifies allocation information of resource partitioning for uplink transmission and downlink transmission within the first channel transmission periodicity, or within a validity time period of the first channel.

2. The method according to claim 1, wherein the first channel transmission periodicity is preconfigured or predefined, and a length thereof is N1 sub-frames or N2 symbols or N3 slots or N4 first time units or N5 micro slots, wherein all of N1, N2, N3, N4, and N5 are integers greater than or equal to 1, and a length of a first time unit is predefined as B1 sub-frames or B2 symbols or B3 slots or B4 micro slots, wherein all of B1, B2, B3, and B4 are integers greater than or equal to 1; or
   the validity time period of the first channel is preconfigured or predefined, and a length thereof is M1 sub-frames or M2 symbols or M3 slots or M4 first time units or M5 micro slots, wherein all of M1, M2, M3, M4, and M5 are integers greater than or equal to 1, and a length of a first time unit is predefined as B1 sub-frames or B2 symbols or B3 slots or B4 micro slots, wherein all of B1, B2, B3, and B4 are integers greater than or equal to 1.

3. The method according to claim 1, wherein the preset time-frequency resource is located in a first symbol or first K1 symbols within the first channel transmission periodicity in time domain, wherein K1 is an integer greater than or equal to 1;
   and/or,
   the preset time-frequency resource is located in preset K2 Sub-Carriers (SCs) or Resource Elements (REs) or Resource Units (RUs) in frequency domain, wherein K2 is an integer greater than or equal to 1, an RU is a resource region occupying X1 symbols in time domain and X2 SCs or X2 REs in frequency domain, the X2 SCs or the X2 REs are consecutive or inconsecutive in frequency domain, and both X1 and X2 are integers greater than or equal to 1.

4. The method according to claim 1, wherein the preset time-frequency resource is consecutive in frequency domain; or
   the preset time-frequency resource is dispersed within a system bandwidth or within a bandwidth corresponding to downlink transmission under a predefined rule in frequency domain.

5. The method according to claim 4, wherein the preset time-frequency resource is distributed uniformly within the bandwidth with a preset granularity in frequency domain; or
   the preset time-frequency resource is distributed at a position of a highest frequency or a lowest frequency or a central frequency within the bandwidth in frequency domain.

6. The method according to claim 1, wherein the first channel at least notifies the allocation information of resource partitioning for uplink transmission and downlink transmission within the first channel transmission periodicity, or within the validity time period of the first channel as follows:
   the first channel at least notifies the allocation information of resource partitioning for uplink transmission and downlink transmission in each first time unit, within the first channel transmission periodicity or within the validity time period of the first channel, wherein a length of the first time unit is predefined as B1 sub-frames or B2 symbols or B3 slots or B4 micro slots, wherein all of B1, B2, B3, and B4 are integers greater than or equal to 1.

7. The method according to claim 6, wherein allocations of uplink transmission resources and downlink transmission resources in respective first time units, within the first channel transmission periodicity or within the validity time period of the first channel are same; or
   allocations of uplink transmission resources and downlink transmission resources in respective first time units, within the first channel transmission periodicity or within the validity time period of the first channel are different from each other; or
   allocations of uplink transmission resources and downlink transmission resources in a part of first time units, within the first channel transmission periodicity or within the validity time period of the first channel are same, and allocations of uplink transmission resources and downlink transmission resources in the other part of the first time units, within the first channel transmission periodicity or within the validity time period of the first channel are different from each other.

8. The method according to claim 1, wherein the allocation information of resource partitioning for uplink transmission and downlink transmission indicates at least two of following symbol positions:
   a symbol for uplink transmission;
   a symbol for downlink transmission; or
   a symbol for a guard period; or
   the allocation information of resource partitioning for uplink transmission and downlink transmission indicates one of a plurality of predefined uplink-downlink allocation structures.

9. The method according to claim 1, wherein the allocation information of resource partitioning for uplink transmission and downlink transmission indicates resource positions of the uplink transmission resource and the downlink transmission resource in frequency domain.

10. The method according to claim 1, wherein before the first channel is transmitted over the preset time-frequency resource within the first channel transmission periodicity according to the first channel transmission periodicity, the method further comprises:
    allocating the uplink transmission resource and the downlink transmission resource within the first channel transmission periodicity or within the validity time period of the first channel, according to a current amount of an uplink traffic load and a current amount of a downlink traffic load.

11. An apparatus for allocating an uplink transmission resource and a downlink transmission resource, the apparatus comprising at least one processor and a memory; wherein the memory is configured to store computer readable program codes, and the at least one processor is configured to execute the computer readable program codes to:

transmit a first channel over a preset time-frequency resource within a first channel transmission periodicity according to the first channel transmission periodicity, wherein the first channel at least notifies allocation information of resource partitioning for uplink transmission and downlink transmission within the first channel transmission periodicity, or within a validity time period of the first channel.

12. The apparatus according to claim 11, wherein the first channel transmission periodicity is preconfigured or predefined, and a length thereof is N1 sub-frames or N2 symbols or N3 slots or N4 first time units or N5 micro slots, wherein all of N1, N2, N3, N4, and N5 are integers greater than or equal to 1, and a length of a first time unit is predefined as B1 sub-frames or B2 symbols or B3 slots or B4 micro slots, wherein all of B1, B2, B3, and B4 are integers greater than or equal to 1; or the validity time period of the first channel is preconfigured or predefined, and a length thereof is M1 sub-frames or M2 symbols or M3 slots or M4 first time units or M5 micro slots, wherein all of M1, M2, M3, M4, and M5 are integers greater than or equal to 1, and a length of a first time unit is predefined as B1 sub-frames or B2 symbols or B3 slots or B4 micro slots, wherein all of B1, B2, B3, and B4 are integers greater than or equal to 1.

13. The apparatus according to claim 11, wherein the preset time-frequency resource is located in a first symbol or first K1 symbols within the first channel transmission periodicity in time domain, wherein K1 is an integer greater than or equal to 1;

and/or, the preset time-frequency resource is located in preset K2 Sub-Carriers (SCs) or Resource Elements (REs) or Resource Units (RUs) in frequency domain, wherein K2 is an integer greater than or equal to 1, an RU is a resource region occupying X1 symbols in time domain and X2 SCs or X2 REs in frequency domain, the X2 SCs or the X2 REs are consecutive or inconsecutive in frequency domain, and both X1 and X2 are integers greater than or equal to 1;

and/or, the preset time-frequency resource is consecutive in frequency domain; or the preset time-frequency resource is dispersed within a system bandwidth or within a bandwidth corresponding to downlink transmission under a predefined rule in frequency domain.

14. The apparatus according to claim 13, wherein the preset time-frequency resource is distributed uniformly within the bandwidth with a preset granularity in frequency domain; or the preset time-frequency resource is distributed at a position of a highest frequency or a lowest frequency or a central frequency within the bandwidth in frequency domain.

15. The apparatus according to claim 11, wherein the first channel at least notifies the allocation information of resource partitioning for uplink transmission and downlink transmission within the first channel transmission periodicity, or within the validity time period of the first channel as follows:

the first channel at least notifies allocation information of an uplink transmission resource and a downlink transmission resource in each first time unit, within the first channel transmission periodicity or within the validity time period of the first channel, wherein a length of the first time unit is predefined as B1 sub-frames or B2 symbols or B3 slots or B4 micro slots, wherein all of B1, B2, B3, and B4 are integers greater than or equal to 1.

16. The apparatus according to claim 15, wherein allocations of uplink transmission resources and downlink transmission resources in respective first time units, within the first channel transmission periodicity or within the validity time period of the first channel are same; or allocations of uplink transmission resources and downlink transmission resources in respective first time units, within the first channel transmission periodicity or within the validity time period of the first channel are different from each other; or allocations of uplink transmission resources and downlink transmission resources in a part of first time units, within the first channel transmission periodicity or within the validity time period of the first channel are same, and allocations of uplink transmission resources and downlink transmission resources in the other part of the first time units, within the first channel transmission periodicity or within the validity time period of the first channel are different from each other.

17. The apparatus according to claim 11, wherein the allocation information of resource partitioning for uplink transmission and downlink transmission indicates at least two of following symbol positions:

a symbol for uplink transmission;

a symbol for downlink transmission; or a symbol for a guard period; or the allocation information of resource partitioning for uplink transmission and downlink transmission indicates one of a plurality of predefined uplink-downlink allocation structures.

18. The apparatus according to claim 11, wherein the allocation information of resource allocation for uplink transmission and downlink transmission indicates resource positions of the uplink transmission resource and the downlink transmission resource in frequency domain.

19. The apparatus according to claim 11, wherein the at least one processor is further configured to execute the computer readable program codes to allocate the uplink transmission resource and the downlink transmission resource within the first channel transmission periodicity or within the validity time period of the first channel, according to a current amount of an uplink traffic load and a current amount of a downlink traffic load, before the first channel is transmitted over the preset time-frequency resource within the first channel transmission periodicity according to the first channel transmission periodicity.

20. The apparatus according to claim 11, wherein the apparatus is a base station or a terminal.

\* \* \* \* \*